United States Patent [19]
McCauley

[11] Patent Number: 5,947,384
[45] Date of Patent: Sep. 7, 1999

[54] YARD BLOWER FOR DISTRIBUTING YARD CARE MATERIAL

[76] Inventor: William H. McCauley, P.O. Box 626, Due West, S.C. 29639

[21] Appl. No.: 09/090,854

[22] Filed: Jun. 4, 1998

[51] Int. Cl.[6] ........................................................ B05B 7/24
[52] U.S. Cl. ............................ 239/152; 239/307; 239/346
[58] Field of Search ..................................... 239/152–154, 239/304, 307, 308, 379, 652–654, 655, 289, 345, 346; 406/38, 98, 141, 153, 122; 15/328, 321

[56] References Cited

U.S. PATENT DOCUMENTS

| | | | |
|---|---|---|---|
| 2,112,603 | 3/1938 | Perron . | |
| 3,223,286 | 12/1965 | Sawyer | 239/153 X |
| 3,539,110 | 11/1970 | Kobayashi | 239/355 X |
| 3,758,036 | 9/1973 | Bauder et al. | 239/154 X |
| 4,089,441 | 5/1978 | Cole et al. | 239/154 X |
| 4,993,639 | 2/1991 | Hata | 239/346 X |
| 5,190,225 | 3/1993 | Williams | 239/154 X |
| 5,240,186 | 8/1993 | Dobbins et al. | 239/154 X |

FOREIGN PATENT DOCUMENTS

| | | | |
|---|---|---|---|
| 358274 | 12/1961 | Switzerland | 239/154 |

Primary Examiner—Lesley D. Morris
Attorney, Agent, or Firm—Robert R. Reed; Cort Flint

[57] ABSTRACT

Apparatus for distributing yard care material is disclosed using a yard blower having a hand held blower tube. A dry material feed system is affixed to a tube section of the blower tube which introduces dry material into an air flow generated by the blower by a feed opening formed in the tube section. An injection gate controls the amount of dry material dispensed from the feed hopper into the air flow. By using a slopping wall, a gravity feed of the dry material is made possible. Additionally, a liquid feed system may be provided which is secured to the dry material feed hopper to feed a liquid yard treatment material also by gravity feed. Advantageously, a liquid feed conduit is formed on the exterior of the blower tube and has an outlet end disposed a distance from the air exit end of the blower tube so that the liquid is injected into the air flow as it exits the blower tube for atomization and distribution to a treatment area. The apparatus may be provided integral with a special tube section which can be sold and interfitted with a blower tube of an existing or new yard blower.

23 Claims, 5 Drawing Sheets

YARD BLOWER FOR DISTRIBUTING YARD CARE MATERIAL

BACKGROUND OF THE INVENTION

The invention relates to apparatus for distributing liquid or dry yard treatment materials, more particularly to an apparatus using a portable blower for distributing the material to a treatment area using an air flow generated by the blower through a blower tube which may be used with new or existing equipment.

Heretofore, various devices have been known for the application of liquid or dry materials for lawn, plants, gardens and the like, wherein a dry or liquid material is either mixed with a water or air stream. For example, U.S. Pat. No. 5,392,996 discloses an attachment for a portable leaf blower for distributing a pesticide dust. U.S. Pat. No. 4,474,327 discloses a hand held blower which distributes a granular fertilizer using a discharge air stream from the blower. The device requires a venturi throat for providing a vacuum source for drawing the fertilizer particles into the air stream. U.S. Pat. No. 5,429,278 discloses a portable garden powder duster. U.S. Pat. No. 4,089,441 discloses a hopper feeder for a portable blower for dispensing a powder material into an air flow. U.S. Pat. No. 3,776,459 discloses a sprayer attachment for leaf blower which dispenses a liquid insecticide.

While the above prior art has certain suitable characteristics, they do not provide a simple, easy to use, and reliable apparatus for dispensing a liquid and/or dry lawn treatment material either as a new or a retrofit an existing yard blower.

Accordingly, an object of the present invention is to provide a portable yard blower having a blower tube through which an air flow is created in which a liquid or dry material may be easily and reliably dispensed.

Still another object of the invention is to provide apparatus for retrofitting an existing yard blower for distributing a liquid or dry treatment material in an easy and convenient manner.

Another object of the invention is to provide an air blower having a blower tube through which an air flow is generated and a liquid and/or dry material may be dispensed using gravity feed eliminating the need for relatively complex feeding mechanisms.

Another object of the present invention is to provide an air blower having effective feeding of a dry and/or liquid yard treatment material at an effective portion of the air stream so that the material is effectively distributed to the lawn or other treatment area.

SUMMARY OF THE INVENTION

The above objectives are accomplished according to the present invention by providing apparatus for distributing liquid or dry yard treatment materials comprising a portable blower for creating an airflow through a handheld blower tube having an exit end through which the exiting airflow exits the blower tube. A feed hopper is carried by the tube for feeding a granular, dry material into the tube. A feed opening receives the dry material from the hopper and introduces the material into the air flow so that the dry material is mixed with the air flow passing through the blower tube. An injector gate is disposed between the hopper and the feed opening for controlling the injection of the dry material into the feed opening and tube. A container is carried by the tube for distributing a liquid material. A feed conduit is connected on one end to the container which has a second, free end terminating near the exit end of the tube for distributing liquid material into the exiting air flow. A valve controls the flow of liquid material through the conduit. Metering means for reliably metering the amount of liquid material distributed into the exiting airflow includes means for controlling the velocity of air flow through the tube; an adjustable valve element to provide a desired metering opening; and a diameter of the feed conduit being of a pre-selected size.

Control means for controlling the amount of dry material distributed includes the injector gate having a gate opening and an adjustable element for adjusting a size of a valve aperture to vary the amount of dry material introduced into said air flow. The feed opening includes a first part formed in the hopper and a second part formed in the blower tube being disposed in flow alignment, and the adjustable element includes a solid sliding gate disposed between the first and second part of the feed opening so that the sliding gate may be moved to align the gate opening in various positions relative to the feed opening to vary the valve aperture size and the amount of dry material distributed there through. The control means further includes means for adjusting the velocity of the air flow in the blower tube.

The feed hopper comprises a sloping wall disposed at an angle to the longitudinal axis of the blower tube for providing a gravity feed of the dry material into the blower tube and airflow. A mount secures the liquid container to the sloped wall of the hopper providing a gravity feed of the liquid to the exit end of the blower tube. The liquid feed conduit is carried on an exterior of the blower tube so the interior of the tube is kept dry. Means may also be provided for connecting the liquid feed conduit to an outside water source providing a generally continuous supply of water to the feed conduit.

Advantageously, the apparatus may be provided in the form of an auxiliary tube section adapted for interfitting with the sections of the blower tube; and the feed hopper is integral with the auxiliary tube section. The liquid feed container may be removably attached to the hopper and the feed opening may be preformed in the auxiliary tube

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 3A is an alternate embodiment for a liquid feeding system according to the invention;

DESCRIPTION OF A PREFERRED EMBODIMENT

Figure 1:
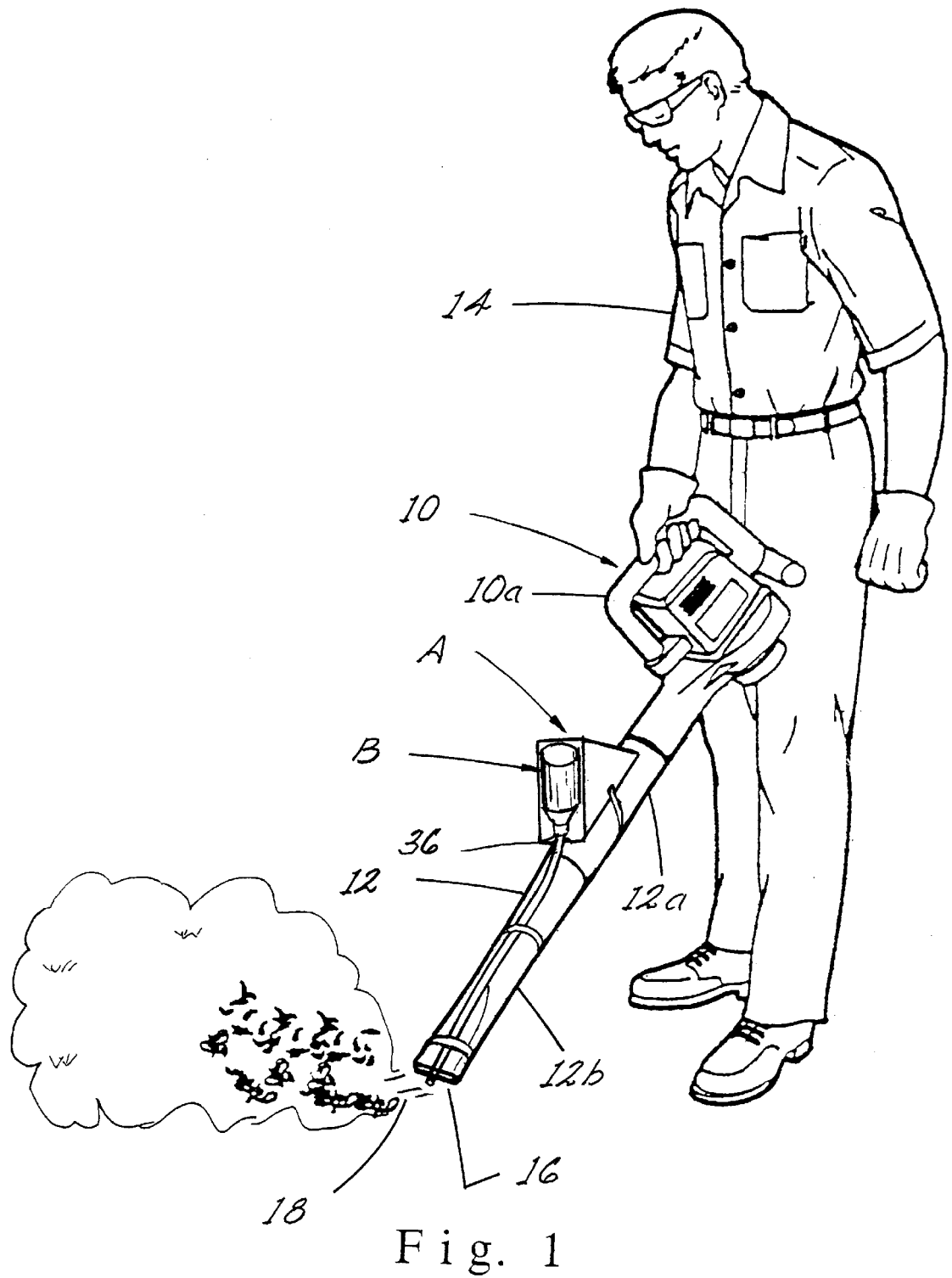
FIG. 1 is a perspective view of a handheld air blower and apparatus for feeding a dry and/or liquid material for yard treatment and the like in accordance with the invention.
Figure 2:
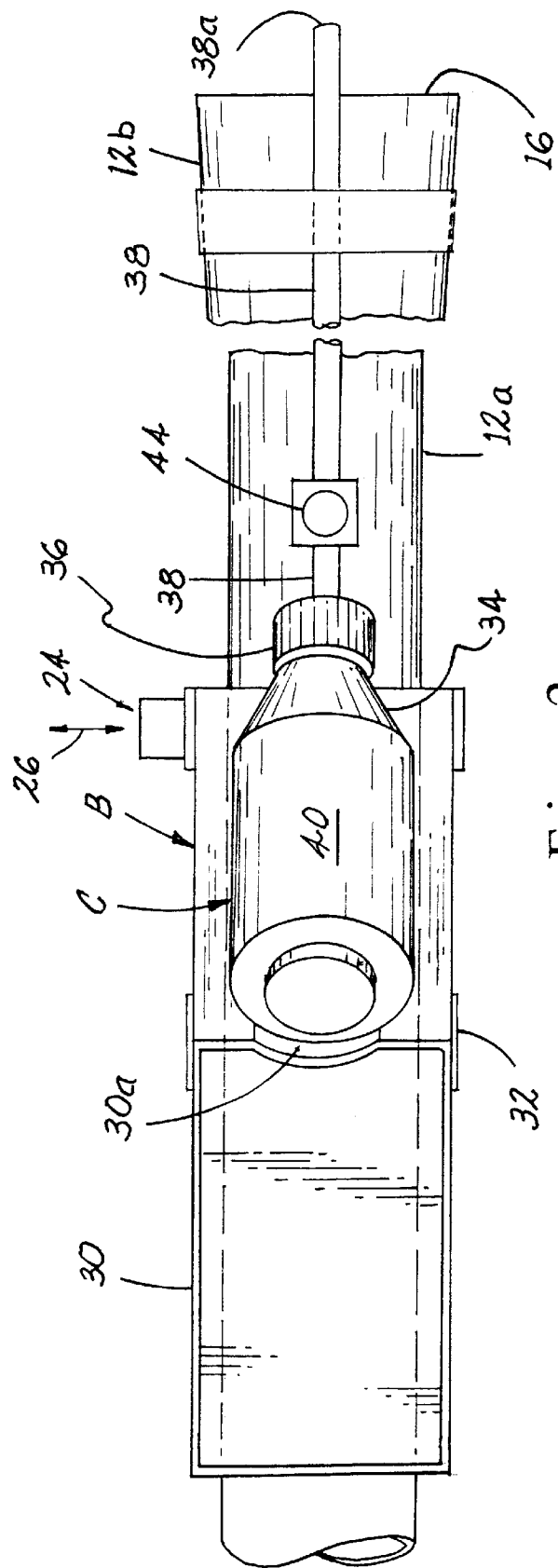
FIG. 2 is a top plan view of apparatus for dispensing liquid and/or dry yard treatment material using an air blower in accordance with the present invention.

Referring now to the drawings, the invention will be described in more detail.

FIG. 1 illustrates apparatus for distributing a liquid or dry yard treatment material, designated generally as A, which includes a portable blower 10 which generates an air flow that is distributed through a blower tube 12 having tube sections 12a and 12b fitted together. Blower 10 may be provided with a handle 10a which can be held by the hand of a user 14. Alternately, the air blower may be provided with a back pack frame for carrying the blower and the hand held tube may be connected by a flexible hose. Blower tube 12 has an exit end 16 through which air flow 18 exits the blower tube. A feed system for feeding a dry material into tube 12 is illustrated in the form of a feed hopper, designated generally as B, affixed to blower tube 12.

Figure 5:
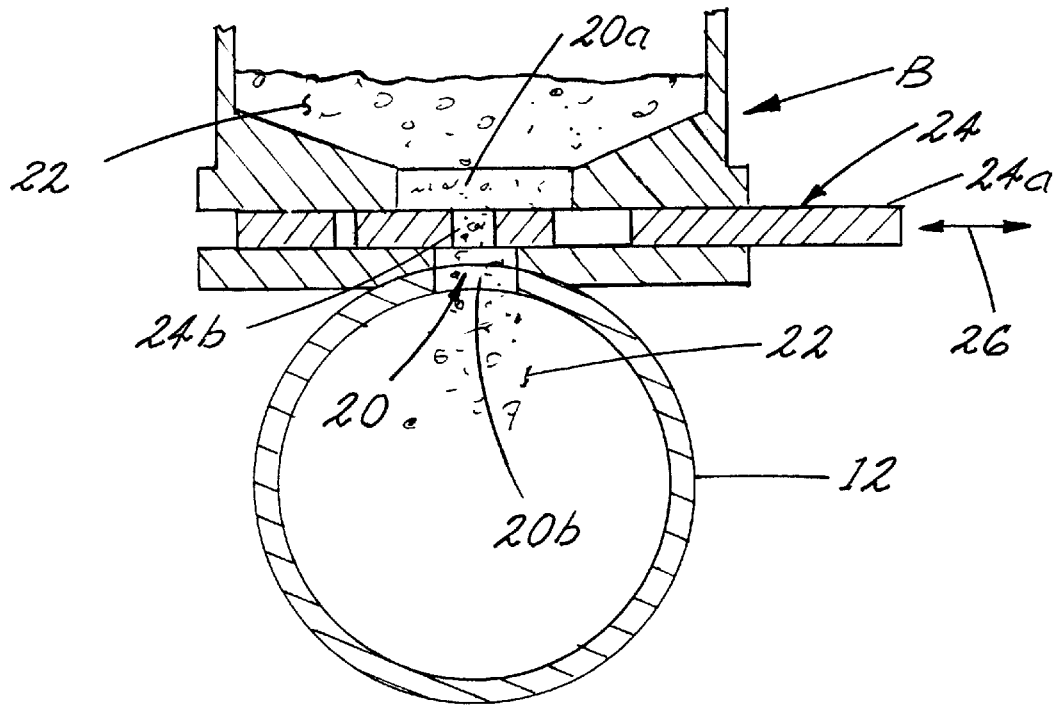
FIG. 5 is a sectional view taken along line 5—5 of FIG. 4 according to the invention.

As can best be seen at FIG. 5, a feed opening, designated generally as 20, is formed for receiving dry material 22 from feed hopper B. The dry material is then mixed with air flow 18 passing through the blower tube 12. An injector gate assembly, designated generally as 24 is disposed between feed hopper B and feed opening 20 which includes an injector gate 24a having a gate opening 24b for progressively opening and closing the feed opening. In this manner the amount of dry material introduced into the air flow is controlled. It is noted that feed opening 20 comprises a first part 20a formed in hopper B and a second part 20b formed in blower tube 12. Gate assembly 24 includes injection gate 24a in the form of an adjustable member which slides in the direction of arrow 26 having gate opening 24b, the remainder of which is solid. The adjustable injection gate is disposed between the first and second parts of feed opening 20 so that gate opening 24b may be aligned more or less with the feed opening to vary the amount of dry material distributed there-through. The alignment of gate opening 24b with the feed opening defines a variable valve aperture. The amount of dry material distributed is also determined by the velocity of the air flow in the blower tube which may be adjusted using conventional means by employing either a variable speed controlled blower or multi-speed blower motor and switch.

Figure 3:
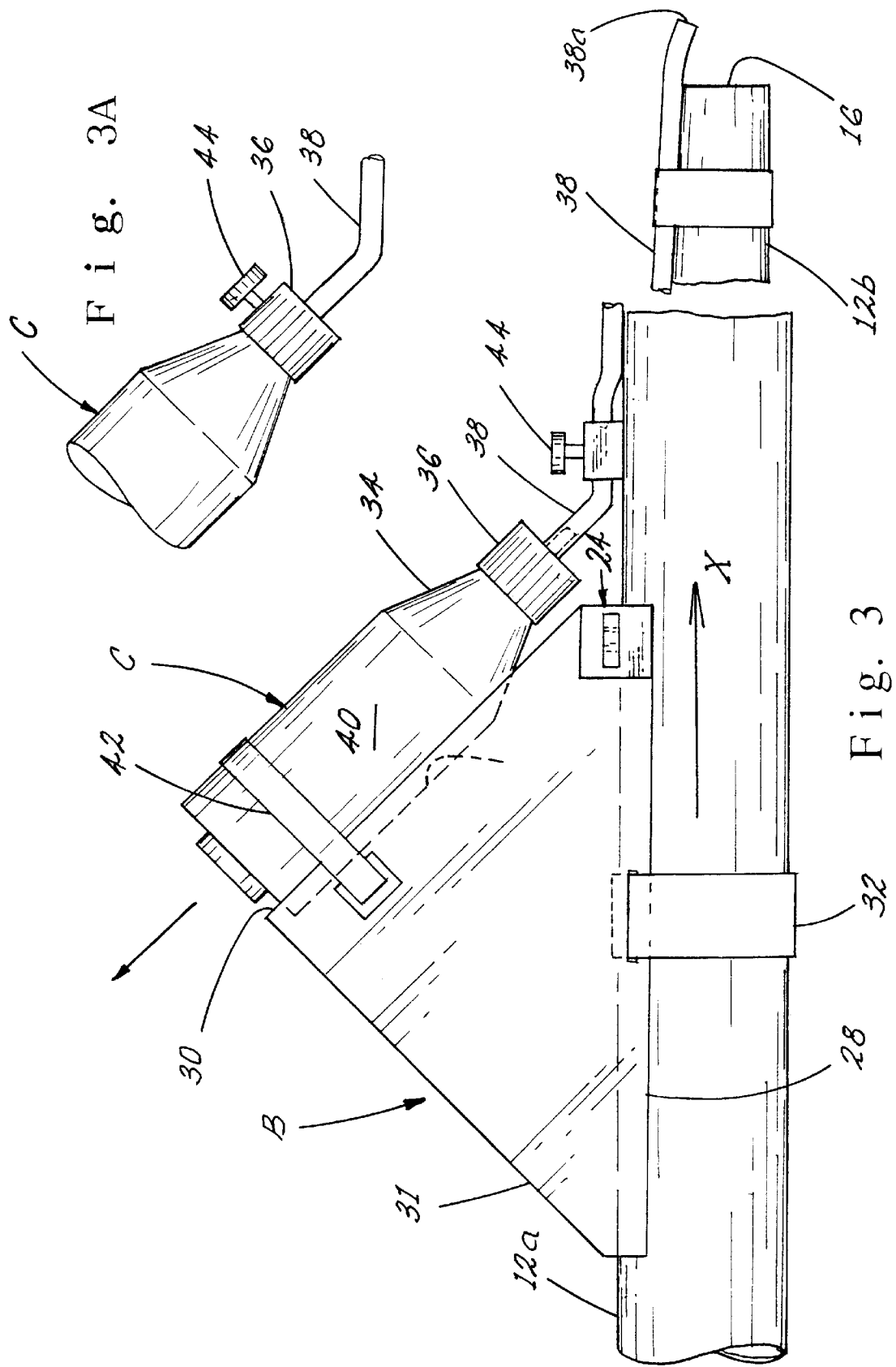
FIG. 3 is a side elevation illustrating an apparatus for feeding dry and/or liquid material for introduction into an air stream of a air blower in accordance with the present invention.

Preferably, hopper B includes a first wall 28 generally parallel to a flow axis "X" of blower tube 12, and a second wall 30 disposed at an angle to the flow axis (FIG. 3). By this means, dry material 22 is fed by gravity through feed opening 20 into the air flow. This eliminates the need for mechanical feeding means such as augers, venturis, and the like, and results in a more simplified reliable feeding system. Likewise, the injection gate assembly provides a reliable control over the amount of dry material injected into the air flow. By introducing the dry material into the air flow upstream from exit end 16 of the blower tube, a good mixing of the dry material and air flow are achieved before the air flow exits the tube 12b.

Figure 6:
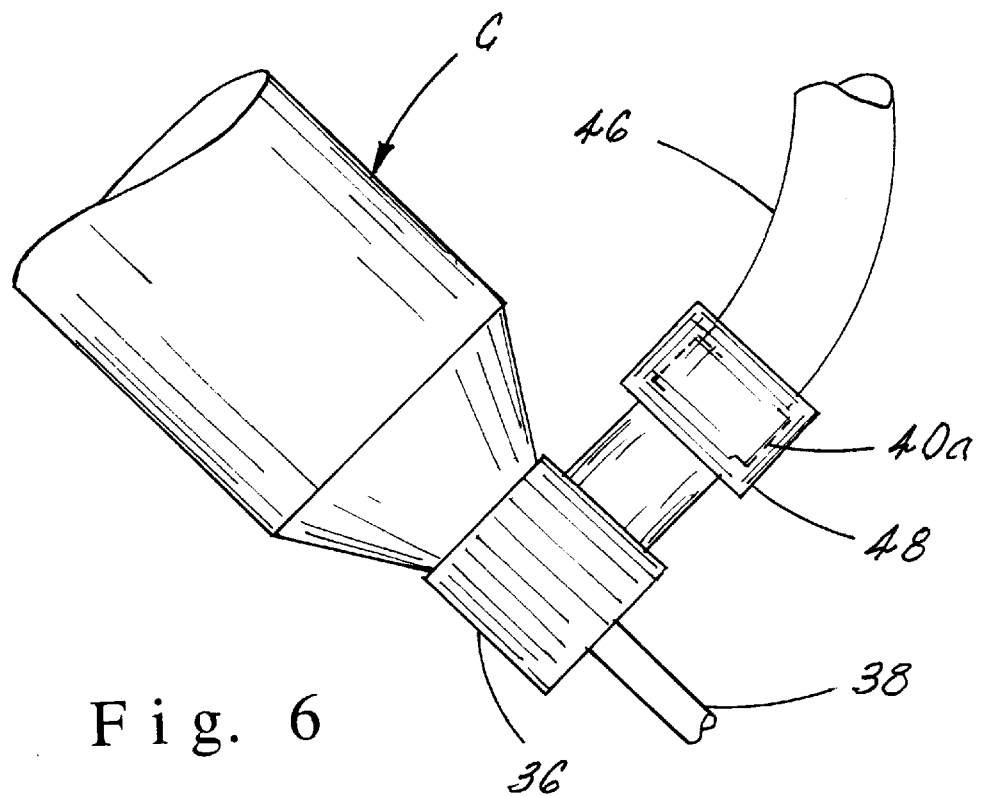
FIG. 6 is an elevation illustrating an alternate means for supplying a liquid to a liquid feeding system according to the invention.

Preferably wall 30 is sloped at an angle of about 45 degrees to flow axis X, so that a top 31 of the hopper B is held in a position which is approximately horizontal (FIGS. 1 and 3). Any suitable means may be utilized for attaching hopper 30 to blower tube 12, such as a velcro strap 32. A liquid feed system for feeding a liquid yard treatment material may also be utilized with the invention, and quite advantageously may be combined with the dry feed system so that either a dry or liquid yard treatment material may be selected. Alternately, a dry and liquid material may be distributed simultaneously for yard treatment and the like. The liquid feed system comprises a source of a liquid, which in the illustrated embodiment of FIGS. 1–4, includes a container C having a neck portion 34 which tapers down to a closure cap 36. A feed conduit 38 is connected by means of cap 36 to communicate with a liquid 40 carried inside container C. Liquid feed conduit 38 extends along an exterior of blower tube 12 and advantageously terminates at an outlet end 38a slightly pass exit end 16 of blower tube 12. The liquid is thus injected into the air flow and atomized for being carried away and dispensed onto an area for treatment. Advantageously, container C is strapped onto hopper B by means of a velcro strap 42. By strapping container C onto slopping wall 30, a gravity feed of the liquid is also possible. For this purpose, slopping wall 30 may be made to have a slightly concave contour at 30a for cradling the container. Alternately, an attachment means between the concave contour and the container can be provided. By carrying the feed conduit on the outside of the tube, a wetting of the interior of the tube is avoided as may cause an impairment to the flow of dry material if such should be done in conjunction with or shortly after liquid feeding. The valve 44 is provided for controlling the amount of liquid fed through the feed conduit 38. Means for controlling the amount of liquid delivered to the conduit and into the air flow is provided by the valve, the diameter of feed conduit 38, and the velocity of the air flow in the tube. FIG. 3A shows the valve carried directly on the cap of the container rather than in the conduit. Valve 44 may be any continuously variable valve having a variable metering orifice. FIG. 6 shows an alternate arrangement where instead of using a batch supply of liquid in a container C, a continuous supply of liquid such as connection to a water supply source provided by a utility can be utilized. In this case, a conventional garden hose 46 is connected to cap 36 by means of a female hose coupling 40a. In this manner a continuous supply of liquid may be fed to the air blower rather than a batch method. In this case, a concentrated second liquid may also be utilized, contained in container C, that is metered into the continuous water flow.

Figure 4:
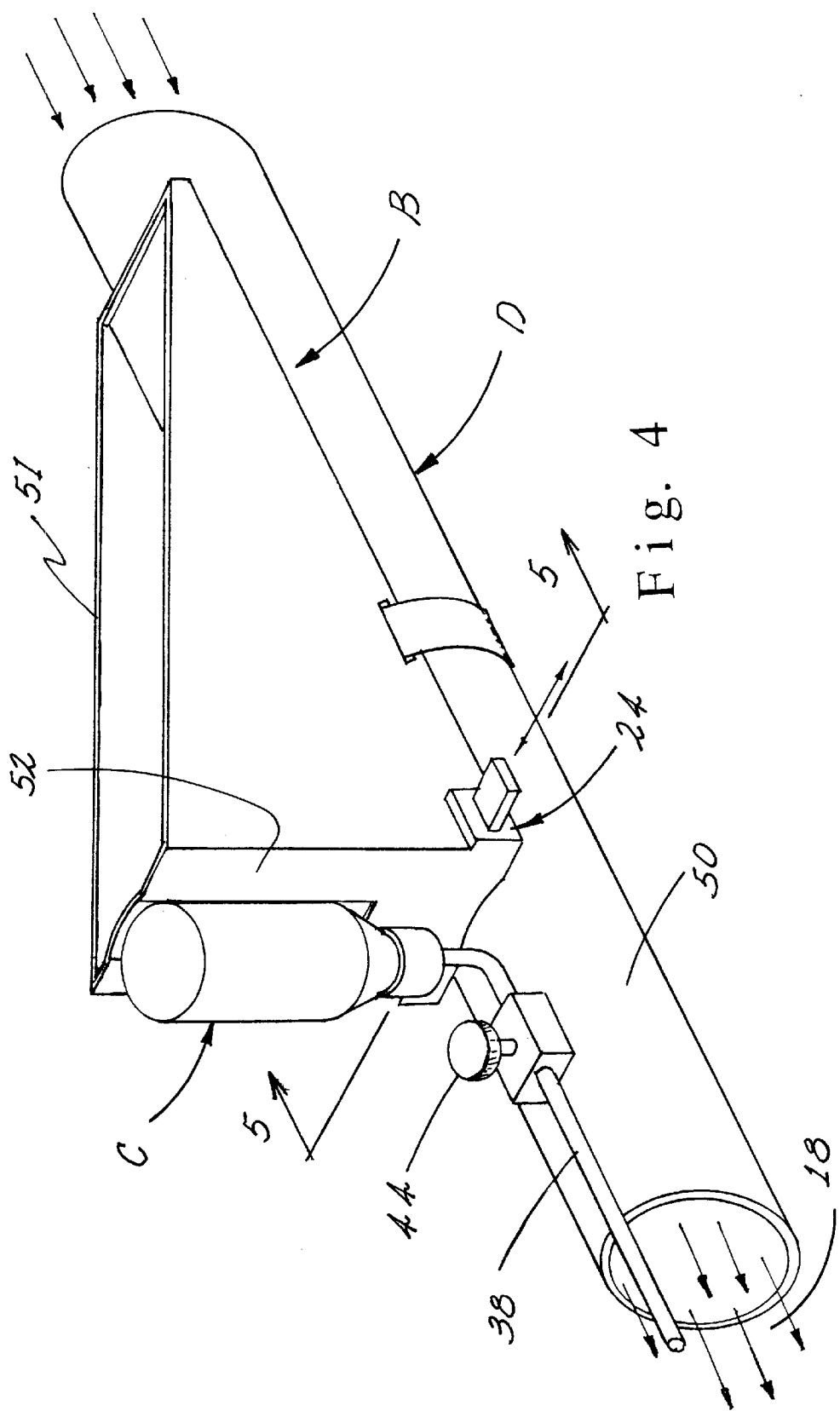
FIG. 4 is a perspective view illustrating apparatus for feeding dry and/or liquid yard treatment material to an air stream according to the invention.

While the invention has been illustrated in terms of the hopper being strapped to blower tube section 12a when the invention may be utilized in connection with an existing air blower, it is to be understood that the invention may also be built into the air blower and supplied new. Alternately, instead of being strapped to a tube, hopper B may be made as one piece with a special tube section (not shown), and fitted into the blower tube of a conventional or new yard blower. Likewise, instead of being supplied for use with an existing air blower, a strapped hopper may be supplied with a special tube section D, as shown in FIG. 4 to be utilized in a fitted arrangement with an existing air blower tube. In this case, the feed tube opening of the injector gate assembly 24 is already formed in tube section 50, whereas in the other cases it is necessary to drill a hole in a preexisting tube section. In FIG. 4, an alternate arrangement is also shown wherein a perpendicular wall 52 rather than a 45° sloping wall is utilized which may be advantageous in the case of some air blower feeding systems. Once again, the hopper B is made so that a top 51 becomes approximately horizontal when the blower is held and in use.

While the invention is illustrated employing a dry and a liquid material feed system which is highly advantageous, it is to be understood that the invention may be exploited with only one or the other.

While a preferred embodiment of the invention has been described using specific terms, such description is for illustrative purposes only, and it is to be understood that changes and variations may be made without departing from the spirit or scope of the following claims.

What is claimed is:

1. Apparatus for distributing liquid or dry yard treatment materials comprising:
   a portable blower for creating an airflow having an inlet and an outlet;
   a handheld blower tube connected in fluid communication to the outlet of the blower through which said airflow is delivered, and said blower tube has an exit end through which the exiting airflow exits said blower tube;
   a feed hopper carried by said tube for feeding a granular, dry material to said tube;
   a feed opening for receiving said dry material from said hopper and introducing said material into said air flow so that said dry material is mixed with said air flow passing through said blower tube;
   an injector gate disposed between said hopper and said feed opening for controlling the injection of said dry material into said feed opening and tube;
   a container carried by said tube for distributing a liquid material;
   a feed conduit connected on one end to said container and having a second, free end terminating near said exit end of said tube for distributing liquid material into said exiting air flow; and,
   a valve for controlling the flow of liquid material through said conduit.

2. The apparatus of claim 1 including metering means for metering the amount of liquid material distributed into said exiting airflow.

3. The apparatus of claim 2 wherein said metering means includes:
   means for controlling the velocity of air flow through said tube; and
   said valve including an adjustable valve element to provide a desired metering opening.

4. The apparatus of claim 3 wherein said metering means includes a diameter of said feed conduit being of a preselected size.

5. The apparatus of claim 1 including control means for controlling the amount of dry material distributed including:
   said injector gate including a gate opening and an adjustable element for adjusting a size of said gate opening to vary the amount of dry material introduced into said air flow.

6. The apparatus of claim 5 wherein said feed opening includes a first part formed in said hopper and a second part formed in said blower tube being disposed in flow alignment, and said adjustable element includes a solid sliding gate disposed between said first and second part of said gate opening having a valve aperture so that said sliding gate may be moved to align said valve aperture in various positions relative to said gate opening to vary the opening and the amount of dry material distributed there through.

7. The apparatus of claim 5 wherein said control means includes means for adjusting the velocity of said air flow in said blower tube.

8. The apparatus of claim 1 wherein said hopper comprises a sloping wall disposed at an angle to the longitudinal axis of said blower tube for providing a gravity feed of said dry material into said blower tube and airflow.

9. The apparatus of claim 8 including a mount securing said liquid container to said sloped wall of said hopper providing gravity feed of said liquid to said exit end of said blower tube.

10. The apparatus of claim 1 wherein said liquid feed conduit is carried on an exterior of said blower tube.

11. The apparatus of claim 1 including means for connecting said liquid feed conduit to an outside water source providing a generally continuous supply of water to said feed conduit.

12. Apparatus for distributing liquid or dry yard treatment materials using a portable blower for creating an airflow through a blower tube though which and airflow is delivered, and said blower tube having an exit end through which an exiting airflow exits said blower tube; said apparatus comprising:
   a feed hopper adapted for feeding a granular, dry material into said blower tube;
   means for mounting said feed hopper to said blower tube;
   a feed opening formed in said blower tube for receiving said dry material from said hopper so that said dry material is mixed with said air flow passing through and exiting said blower tube;
   means for controlling the amount of said dry material introduced into said feed opening and blower tube;
   a liquid container adapted for distributing a liquid material into said air flow;
   means for attaching said liquid container to one of said feed hopper and blower tube;
   a feed conduit connected on one end to said container and having a second, free end terminating near said exit end of said blower tube for distributing liquid material into said exiting air flow; and,
   a valve for controlling the flow of liquid material delivered through said conduit.

13. The apparatus of claim 12 including metering means for metering the amount of liquid material distributed into said exiting airflow which includes:
   means for controlling the velocity of air flow through said tube; and
   said valve including an adjustable valve element to provide a desired metering opening.

14. The apparatus of claim 12 wherein said means for controlling the amount of dry material distributed includes:
   said injector gate including a gate opening and an adjustable element for adjusting a size of said gate opening to vary the amount of dry material introduced into said air flow.

15. The apparatus of claim 14 wherein said gate opening communicates with a tube opening formed in said blower tube being disposed in flow alignment with said gate opening, and said adjustable element includes a solid sliding gate disposed between said gate opening and said tube opening having a valve aperture so that said sliding gate may be moved to align said valve aperture in various positions relative to said gate and tube openings to vary the amount of dry material distributed into said blower tube.

16. The apparatus of claim 12 wherein said hopper comprises a sloping wall disposed at an angle to the longitudinal axis of said blower tube for providing a gravity feed of said dry material into said blower tube and airflow.

17. The apparatus of claim 16 wherein said attachment means includes means of attaching said liquid container to said sloped wall of said hopper providing gravity feed of said liquid to said exit end of said blower tube.

18. Apparatus for distributing yard treatment materials using a portable blower having a blower tube though which an airflow is generated and delivered, and said blower tube having a plurality of tube sections and an exit end through which an exiting airflow exits said blower tube; said apparatus comprising:

an auxiliary tube section adapted for interfitting with said blower tube;

a feed hopper carried by said auxiliary tube section for feeding a granular, dry material into said auxiliary tube section and blower tube when said auxiliary tube section is interfitted with said blower tube;

a feed opening formed in said auxiliary tube section for receiving said dry material from said hopper so that said dry material is mixed with said air flow passing through and exiting said blower tube;

means for controlling the amount of said dry material introduced into said feed opening and blower tube;

a liquid container adapted for distributing a liquid material into said air flow carried by one of said feed hopper and auxiliary tube section;

a feed conduit connected on one end to said container and having a second, free end terminating near said exit end of said blower tube for distributing liquid material into said exiting air flow; and, a valve for controlling the flow of liquid material delivered through said conduit.

19. The apparatus of claim 18 including metering means for metering the amount of liquid material distributed into said exiting airflow which includes:

means for controlling the velocity of air flow through said tube; and said valve including an adjustable valve element to provide a desired metering opening.

20. The apparatus of claim 18 wherein said means for controlling the amount of dry material distributed includes:

said injector gate including a gate opening and an adjustable element for adjusting the amount of dry material introduced into said air flow through said gate opening.

21. The apparatus of claim 20 wherein said feed opening includes a tube opening formed in said auxiliary tube section being disposed in flow alignment with said gate opening, and said adjustable element includes a solid sliding gate disposed adjacent said tube opening so that said sliding gate may be moved to align said gate opening in various positions relative to said tube opening to vary the amount of dry material distributed into said blower tube.

22. The apparatus of claim 18 wherein said hopper comprises a sloping wall disposed at an angle to the longitudinal axis of said blower tube for providing a gravity feed of said dry material into said blower tube and airflow.

23. The apparatus of claim 18 including attachment means for removably attaching said liquid container to said sloped wall of said hopper providing gravity feed of said liquid to said exit end of said blower tube, and disposable liquid containers.

* * * * *